May 22, 1928.

M. KNAB

ANGLE COCK

Filed March 12, 1927

1,670,412

INVENTOR.
Max Knab

Patented May 22, 1928.

1,670,412

UNITED STATES PATENT OFFICE.

MAX KNAB, OF BROOKLYN, NEW YORK, ASSIGNOR TO THE WESTINGHOUSE AIR BRAKE COMPANY, OF WILMERDING, PENNSYLVANIA, A CORPORATION OF PENNSYLVANIA.

ANGLE COCK.

Application filed March 12, 1927. Serial No. 174,915.

This invention relates to brake pipe angle cocks of railway air brake systems and especially to the type known as safety angle cocks, such as, for example, described in United States Patent to John P. Kelly, No. 1,458,765, dated June 12, 1923.

The use of brake pipe angle cocks for railway air brake systems is well known to those skilled in the art. It is also recognized that the common type of such cocks, consisting of a single manually-operated cone valve, is a potential source of danger, as in case the handle of such an angle cock should be accidentally or maliciously closed when on the road, it would be impossible to apply or control the brakes to the rear of the closed cock, and the consequent loss of braking control might be the cause of serious accidents.

Safety angle cocks have for their purpose the prevention of such accidents, this, in one form, being accomplished by maintaining a normally open by-pass around the key valve of sufficient capacity to permit the free flow of air in either direction to produce a normal operation of the air brake apparatus even if the angle cock is closed.

To illustrate, in the above mentioned patent for example, a by-pass valve is provided which is open under normal conditions and maintains communication between the portions of the brake pipe separated by the closed key valve of the angle cock. This by-pass valve, however, has to be automatically closed promptly whenever the brake pipe hose is uncoupled, to prevent the escape of air from the brake pipe and a consequent undesired application of the brakes. The by-pass valve is operated by a differential piston and the resultant of the pressures on the two sides of this piston effects the desired opening and closing of the valve. As illustrated, the space between the cap of the by-pass valve and the outer face of the piston is divided by a hollow cylindrical stem into a central and a peripheral chamber, the central chamber being in constant communication with atmosphere, and the peripheral chamber being connected with the central chamber—and through it to atmosphere—only in case the by-pass valve is closed. When the by-pass valve is open, the two chambers are separated from each other, the peripheral chamber being sealed by the end of the hollow stem which seats upon a gasket.

In the described operation of the by-pass valve illustrated in the said patent, communication is always maintained between the above mentioned central chamber on the outer face of the piston and atmosphere. It is also set forth that the passage providing for such communication should be restricted so as to insure prompt seating of the by-pass valve in case of uncoupling.

Due to the exposed character and small capacity of the aforementioned passage, there is danger of its stopping up from dust and dirt, or its clogging by snow and ice, especially in view of the location of the valve, and such closing of the passage may endanger the proper operation of the by-pass valve.

In addition, during a great part of the time—whenever a car is not connected to a charged brake pipe—the by-pass valve will be closed, in which case communication exists between the two chambers on the outside of the piston, thereby connecting the peripheral chamber in its turn with atmosphere and permitting dust or dirt to become deposited on the gasket, which may prevent subsequent proper seating of the hollow stem and thereby cause leakage of the brake pipe.

My invention has for its object a safety angle cock of improved construction which shall provide for an open communication by-passing the key valve under usual conditions of operation when an air hose with accompanying car is coupled to the angle cock but which communication is automatically closed upon uncoupling said air hose or upon breaking thereof, which angle cock shall be free from the objection of failure of operation by reason of closure, whether accidental or malicious, of exposed parts.

A further object of the invention is a simplification of construction and elimination of parts which add to the cost and complexity of angle cocks of prior art.

A further object is to take full advantage of pressure air of the brake pipe to assure a quick closure of the communication by-passing the key valve in the event that such passage should be closed.

Further objects of the invention will appear in the development of the specification and drawings hereof, all as set forth in the appended claims.

In the accompanying drawings which form a part of this application, Figure 1 is a view, partly in plan and partly in section, showing an angle cock device embodying my improvement, both the by-pass valve and the key valve being shown in their closed position.

Figures 1, 3:
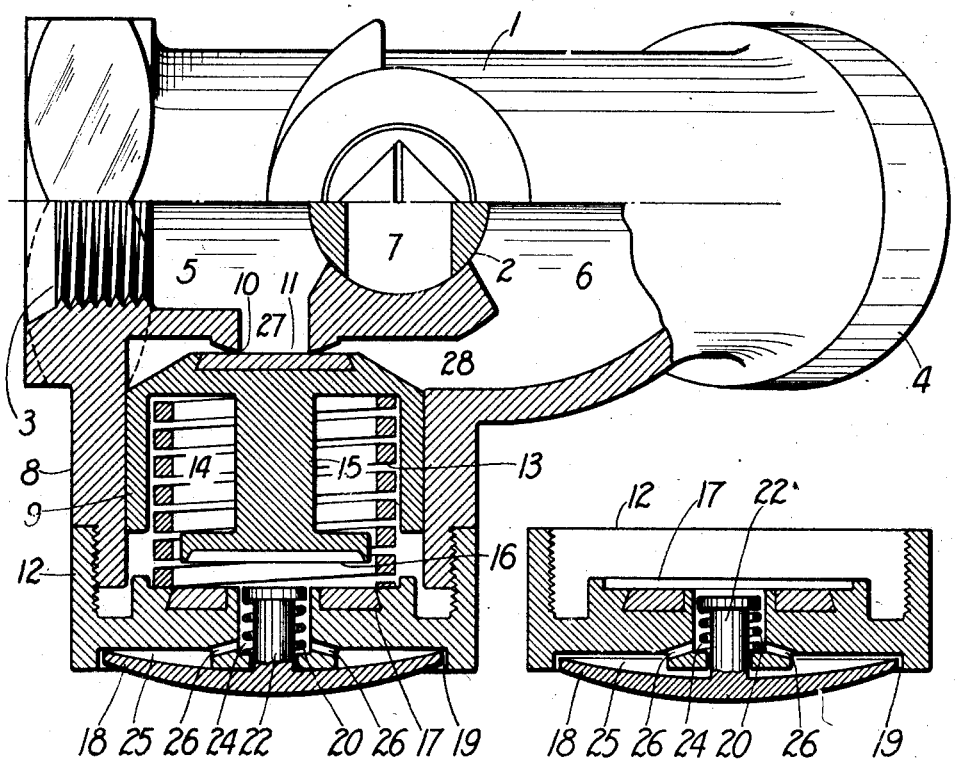
Fig. 3 is a section showing the cap of the said valve with its disc cover in open position.

Referring to the figures, the angle cock body 1 is provided with a ground key valve 2, of the usual type, the handle for this valve being omitted from the drawing. The body 1 has on one of its ends a threaded portion 3 to connect with the brake pipe of the locomotive or car to be equipped with the angle cock, and on its other end a portion 4 to connect with the hose coupling, which, in its turn, connects with the brake pipe hose of the next unit of the train.

Figures 2, 4:
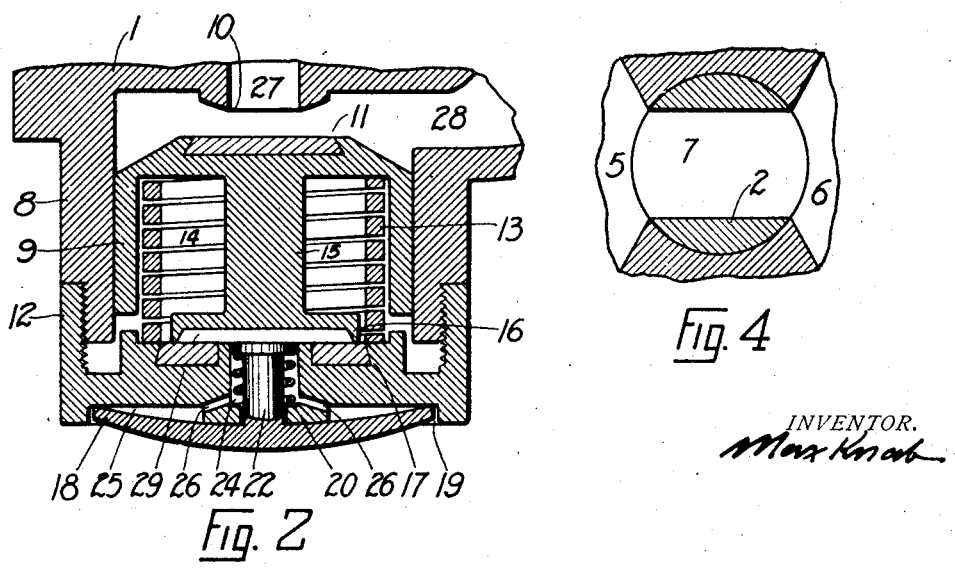
Fig. 2 is a section showing the by-pass valve of Fig. 1 in its open position.
Fig. 4 is a section showing the key valve of Fig. 1 in its open position.

On the opposite sides of the key valve 2 are chambers 5 and 6, the former being in direct communication with the brake pipe of the train unit equipped with the angle cock, the latter in communication with the coupling. A passage 7, provided in the key valve 2, maintains communication between chambers 5 and 6 in the open position of the manually actuated key valve, as shown in Fig. 4.

The parts discussed so far are substantially the same and have the same functions as those of a common type angle cock, and I will now proceed to describe the parts which form the special by-pass unit of the form of my improved device herein illustrated.

A cylinder 8, within which reciprocates a hollow piston 9, forms an integral part of the body 1. It is in communication with the chamber 5 by means of a port 27, and with the chamber 6 by means of a passageway 28. The inside face of the piston 9 cooperates with a valve seat 10 formed at the outside end of the port 27 and constitutes the by-pass valve. A gasket 11, preferably of soft material, inserted in the bottom face of the piston, provides for air-tight sealing of the valve.

The outer end of cylinder 8 is threaded and carries a cap 12. A compression spring 13, located in the chamber 14 of the hollow piston 9, abuts against the outer face of the cap 12 and shoulders against the cap 12. The piston 9 is provided with a stem 15, the outer end of which is expanded and forms a sealing valve 16, which cooperates with a seat 17, preferably of soft material.

A cover 18 having the shape of a disc and being preferably of rigid construction fits into a recess 19 on the outside of the cap 12 and is provided with a shouldered stem 22 reciprocally mounted in a recess 24 of the cap and biased inwardly by a small suitably mounted compression spring 20 which normally maintains the cover in closed position, as shown in Fig. 1. Air communication between chamber 25—formed between the cover 18 and the cap 12—and recess 24 is maintained by way of passages 26, 26.

It should be noted that in its closed position the cover 18 provides for a good mechanical sealing of the chamber 25 and of all the other parts of the by-pass unit in communication with this chamber. However, while it is possible to make this sealing air-tight, I prefer not to do so, and in the present description will assume that cover 18 does not provide for air-tight sealing.

If the piston 9 is in the position indicated in Fig. 2, the by-pass valve is open and communication between chambers 5 and 6, via port 27 and passage 28, is established irrespectively of the position of the key valve 2.

To make clear the operation of my device, I will consider a train where one, several or all the units thereof are equipped with my improved angle cock. I also assume that proper communication has been established in the brake pipe throughout the whole train. In such case all of the angle cocks—with the exception of the closing angle cock at the rear end of the train—are manually opened, i. e. the key valve is brought into the position as shown in Fig. 4.

Now, I will single out on this train an angle cock of my construction, which may be any one with the exception of the closing angle cock, this latter being considered separately later in this description.

As the angle cock is manually opened, communication is established between chambers 5 and 6, brake pipe pressure is exerted on the entire inside face of the piston 9, which causes it to move outwards against the pressure of the spring 13. In the resultant position of the by-pass valve, which is shown in Fig. 2 and which is the normal position for an angle cock connected to a charged brake pipe, the piston is in its outside position, and thereby opens the by-pass valve and closes the sealing valve 16. A chamber 29 is formed under the seat of the sealing valve, this chamber communicating with recess 24 and, via passages 26, 26, with chamber 25. The sealing valve being seated, chamber 14 is closed and sealed air-tight from atmosphere. Due to brake pipe leakage around the piston 9, back pressure will be established in chamber 14, the function of which will be explained in connection with the action of the valve on uncoupling. On account of the differential areas, upon which brake pipe pressure is exerted, the resultant air pressure, which maintains the piston in its outer position against the pressure of spring 13, is the product of the effective area of the seating valve and the unit brake pipe pressure, and unless the brake pipe pressure has dropped below a certain minimum value, as will be described later on, the by-pass valve will stay open and maintain communication between port 27 and passage 28 and thus afford a by-pass which is independent of the key valve 2.

In this condition of the by-pass unit, the cover 18 maintains its closed position, as the sealing valve 16 will prevent air—except a possible small amount due to leakage around valve 16—from flowing into chamber 25 and such small amount of air will easily find its way to atmosphere around the edge of the cover 18, which, as above explained, is not seated air-tight.

Assume, now, that after the continuity of the brake pipe of the train has been established, and has been verified by yard or station test, in accordance with established railroad practice, the key valve of the angle cock which I have singled out, should be closed inadvertently or maliciously. From the foregoing it is apparent that the position of the piston 9 will not be affected by the closing of the key valve 2, and thus brake pipe air may be properly handled through the by-pass valve to produce the normal operation of the air brake apparatus. It should be understood that, with proper dimensioning of the by-pass unit, not only will a service brake pipe reduction but also an emergency brake pipe reduction be unobstructedly transmitted over the entire train line through the by-pass of my angle cock, irrespective of the location of the train unit equipped with it. Proper operation of the air brake apparatus will also be provided for if not only one but a number of my angle cocks have their key valves closed.

As previously outlined, the by-pass valve will be maintained in its open position, as long as the brake pipe pressure on the differential area of the piston overcomes the pressure of spring 13. This will be the case until the brake pipe pressure is practically depleted, as will appear from the following:

Assume, for example, that when the brake pipe pressure has been reduced to a pressure of from 15 to 25 pounds per square inch, depending on the dimensions of the by-pass unit, the differential pressure on the piston will no more suffice to maintain the piston, against the pressure of spring 13, in its outermost position. Due to the overbalancing of the spring pressure, the piston will now be moved inwards but will instantaneously return to its outermost position—without even attaining its innermost position and thus without closing the by-pass valve—due to the following action:

As the brake pipe pressure is reduced to the above illustrative value and the piston starts its inward movement, chamber 14 is connected with chamber 25, via chamber 29, recess 24 and passages 26. The resultant air pressure in chamber 25 moves the cover 18 outwardly and affords a free escape of the pressure air beneath the piston to atmosphere. Absence of back pressure on the outer face of the piston increases the downward force exerted on the piston—as, instead of the previous differential area, now the total area of the piston is effective—this increase being sufficient to return the piston 9 to its outermost position. A further reduction of the brake pipe pressure and the rebuilding of back pressure in chamber 14 will cause a repetition of the above described action and until the brake pipe pressure has not been reduced below a value of from, say, 5 to 10 pounds per square inch, the exact value depending on the dimensions of the by-pass unit, the by-pass valve will stay open.

The aptitude of the by-pass valve to stay open, until the brake pipe has been practically depleted, is of great importance in the case of an emergency brake application as it enables the by-pass valve to remain open until the emergency brake pipe reduction has been properly transmitted through the whole train line.

As it is essential that the by-pass should be maintained closed when the angle cock is used on the rear end of the last unit of a train, spring 13 is so dimensioned as to hold the by-pass valve closed against the full brake pipe pressure acting on the area of valve seat 10.

When it is desired to uncouple and separate the cars, the key valves of the angle cocks are manually closed and the hose is uncoupled in the usual way. Upon the sudden escape of the air from the hose to atmosphere, the pressure on the inner face of the piston 9 is instantly reduced practically to zero and the pressure on the outside of the piston, spring and air, will carry the piston to its inner position, thus closing the by-pass valve. Prompt closing of the by-pass valve, in case of uncoupling, is essential to prevent the escape of air from the brake pipe and a consequent undesired application of the brakes, and is greatly promoted by the back pressure in chamber 14, which builds up in the normal open position of the by-pass valve. The capacity of chamber 29—which by leakage around cover 18 is in constant communication with atmosphere—is reduced to practically a minimum, while the capacity of chamber 14—in which the back pressure builds up when the by-pass valve is open—is practically a maximum for given over-all dimensions of the by-pass valve unit. This assures, in case of uncoupling, the desired instantaneous closing of the by-pass without unduly reducing the size of passages 26, or equivalent air passage connecting chamber 29 with chamber 25.

As can readily be seen, the cover 18 is normally maintained in its seated or closed position by the action of the spring 20. It will be closed if the angle cock is on a train unit not connected to a charged brake pipe line, as in such condition, no air pressure existing, there will be no force to open it; and it will also be normally closed if the angle cock is in a charged brake pipe line, as in such condition, as has been described previously, the by-pass valve will be open and the sealing valve 16 closed, and any small amount of air, which may leak around valve 16 into chamber 25, will easily find its way to atmosphere around the periphery of the cover, such being the case, irrespective of whether the key valve 2 is open or closed.

Only in the rather infrequent cases of depletion of the brake pipe on account of the uncoupling of the car, parting of the hose, or complete bleeding down of the brake pipe line due to an unlimited service or emergency reduction, will sufficient air pressure be established in chamber 25 to open the cover 18. Such opening of the cover, which is caused by the unseating of the sealing valve 16 and the sudden discharge of the pressure from chamber 14, will, in any case, be of very short duration. Consequently, the cover 18 can be regarded as practically always closed and will afford ample protection for the inside of the by-pass valve unit against dust and dirt, and will thus prevent clogging of the passages or formation of objectionable deposits inside of the valve.

While my improved by-pass unit is substantially of a closed character, communication to atmosphere and automatic opening of cover 18, as may be required for proper operation of my device, are assured.

In an inactive condition of the angle cock, should the cover 18 be frozen in due to dirt, snow or ice, or otherwise, it will be dislodged and opened when the brake pipe line with which the angle cock is connected is charged. This dislodging will be effected by the brake pipe pressure built up in chamber 25, due to its communication with chamber 14, and exerted against the cover 18. It should be understood that the force thus exerted on the cover will be of considerable magnitude, as, for instance, for a cover area of 7 square inches (which corresponds to the actual dimensions of tested angle cocks embodying my invention) and a brake pipe pressure of 110 pounds per square inch, the force exerted on the cover will be 770 pounds.

The foregoing detailed description has been given for clearness of understanding and no undue limitation should be deduced therefrom but the appended claims should be construed as broadly as permissible in view of the prior art.

Having thus described my invention, what I claim as new and desire to secure by Letters Patent is:

1. In an angle cock for air brake systems, including a brake pipe, the combination of a key valve, a valve controlling a by-pass for the key valve, a piston for governing the valve, a passageway to atmosphere on one side of the piston, a valve for closing said passageway and a cover for the passageway.

2. In an angle cock the combination of a manually operable key valve, a by-pass for the key valve, a piston to control said by-pass, a passageway to atmosphere on one side of the piston, a valve for closing said passageway and a cover for the passageway.

3. The combination with an air brake system of a by-pass unit for angle cocks, comprising a sealing cover biased in its normally closed position and opened by pressure air from the brake pipe to discharge said pressure air in the operation of the unit.

4. The combination with an air brake system of a by-pass unit for angle cocks comprising a by-pass valve and a chamber charged with brake pipe pressure air in the open position of said valve, a passageway to discharge the air from the chamber to atmosphere upon closure of the by-pass valve, and a normally closed sealing cover for the passageway which opens automatically for the discharge of pressure air from the chamber.

5. In an angle cock, the combination with a manually operated key valve of a by-pass unit comprising a valve and a normally closed protecting cover, said cover being intermittently opened to discharge pressure air upon the opening of the valve.

6. In an angle cock, the combination of a manually operated key valve, a cylinder, a piston reciprocally mounted therein, a by-pass valve operated by the movement of said piston and, when in its open position, establishing a by-pass around the key valve, a chamber on one side of the piston supplied with pressure air in the open position of the by-pass valve, a passageway to connect said chamber with atmosphere, and a normally sealed cover for the passageway, said cover being opened, on closure of the by-pass valve, to discharge pressure air from the chamber to atmosphere.

7. The combination with a brake pipe of an angle cock comprising a manually operated key valve, a by-pass for said key valve normally open when the brake pipe is charged, a cylinder, a piston reciprocally mounted therein and adapted to control the by-pass, a spring which tends to move the piston into a position whereby it causes the by-pass to close, a chamber on one side of the piston occupying substantially the whole inside of the cylinder and normally charged with pressure air, this air assisting the spring in its prompt movement of the piston to close the by-pass when the angle cock is disconnected from the brake pipe on the end opposite to the source of brake pipe pressure air.

8. The combination with a brake pipe of an angle cock comprising a by-pass valve open when the brake pipe is charged, a cylinder, a piston reciprocally mounted therein and adapted to control the by-pass valve, a spring which tends to move the piston into a position whereby said valve is closed, a chamber on one side of the piston occupying substantially the whole inside of the cylinder and normally charged with pressure air, said pressure air assisting the spring in its prompt movement of the piston to close the by-pass valve when the angle cock is disconnected from the brake pipe on the end opposite to the source of brake pipe pressure.

9. In an angle cock, the combination of a manually operable key valve, an automatically controlled by-pass around the key valve, a cylinder, a differential piston reciprocally mounted therein and adapted to control said by-pass, each end of the piston constituting a valve which cooperates with a corresponding valve seat.

10. In a by-pass unit for an angle cock, the combination of a cylinder and a differential piston reciprocally mounted therein, each end of the piston constituting a valve which cooperates with a corresponding valve seat, only one of the two valves being opened or closed at a time.

11. An air valve unit including a chamber and a normally closed protecting cover for same, and a second chamber normally charged with pressure air and intermittently connected with the first chamber to discharge said air through the momentary unseating of said cover.

12. In an air valve unit, the combination of a valve, a normally closed sealing cover to be opened momentarily upon actuation of the valve, and means to insure proper opening of the cover in the event of its freezing closed in an inactive condition.

In testimony whereof I have hereunto signed my name.

New York, N. Y., February 25, 1927.

MAX KNAB.